United States Patent
Slaughter

(10) Patent No.: US 6,511,267 B2
(45) Date of Patent: Jan. 28, 2003

(54) TOOL FOR REMOVING BROKEN FITTINGS

(76) Inventor: Daryl L. Slaughter, 401 Bluebird Dr., East Alton, IL (US) 62024

( * ) Notice: Subject to any disclaimer, the term of this patent is extended or adjusted under 35 U.S.C. 154(b) by 0 days.

(21) Appl. No.: 09/851,784

(22) Filed: May 9, 2001

(65) Prior Publication Data

US 2002/0168236 A1 Nov. 14, 2002

(51) Int. Cl.[7] .......................... B23B 35/00; B23B 51/02
(52) U.S. Cl. .............................. 408/1; 81/441; 408/80; 408/225; 408/227
(58) Field of Search ............................ 408/1 R, 80, 81, 408/82, 224, 225, 230, 201, 227; 81/441, 53.2

(56) References Cited

U.S. PATENT DOCUMENTS

| | | |
|---|---|---|
| 63,822 A | 4/1867 | Young |
| 967,255 A | 8/1910 | Snell et al. |
| 1,016,116 A | 1/1912 | Walters |
| 1,725,515 A * | 8/1929 | Hawkinson et al. ........ 408/1 R |
| 1,754,736 A | 4/1930 | Bryant |
| 1,777,936 A * | 10/1930 | Roberts ...................... 411/919 |
| 1,863,045 A * | 6/1932 | Randall et al. ................ 81/441 |
| 1,875,484 A | 9/1932 | Nigra |
| 1,955,447 A * | 4/1934 | Wright ........................ 408/230 |
| 2,207,542 A | 7/1940 | Hedin |
| 2,391,405 A | 12/1945 | Fuglie |
| 2,411,209 A * | 11/1946 | Hall et al. ................ 15/104.09 |
| 2,480,648 A * | 8/1949 | Harer ........................... 470/10 |
| 2,686,447 A | 8/1954 | Vock et al. |
| 2,863,348 A * | 12/1958 | Conger ....................... 81/125.1 |
| 3,263,533 A * | 8/1966 | Carlson ........................ 81/441 |
| 3,370,489 A | 2/1968 | Andreasson |
| 3,508,321 A | 4/1970 | Wood |
| 3,654,690 A | 4/1972 | Hardin |
| 3,824,027 A * | 7/1974 | Janci .......................... 408/225 |
| 3,952,618 A * | 4/1976 | Seamon ........................ 81/441 |
| 4,111,078 A * | 9/1978 | Seamon ........................ 81/441 |
| 4,646,413 A | 3/1987 | Nall et al. |
| 5,012,566 A | 5/1991 | Getz |
| 5,031,487 A | 7/1991 | Polonsky |
| 5,251,516 A | 10/1993 | Desaulniers |

* cited by examiner

*Primary Examiner*—Daniel W. Howell
(74) *Attorney, Agent, or Firm*—Senniger, Powers, Leavitt & Roedel

(57) ABSTRACT

A tool for removing a tubular member having a threaded exterior, such as a pipe fitting, from a threaded bore. The tool includes a pilot section for guiding the tool into an interior of the tubular member, a shank section adapted for connection to a drill chuck, and a central body for engaging the tubular member. The central body has a cross section transverse the longitudinal axis that is generally circular and that tapers in diameter from the shank section toward the pilot section along an entire length of the central body. At least one flute extends along a helical path on an exterior surface of the central body. The pilot section guides the central body into the interior of the tubular member to grind away the tubular member without damaging the threaded bore.

17 Claims, 2 Drawing Sheets

TOOL FOR REMOVING BROKEN FITTINGS

BACKGROUND OF THE INVENTION

This invention relates generally to drilling tools, and in particular to a tool for removing a broken portion of a tubular pipe fitting from a threaded bore.

Threaded junctions for attaching sections of tubular conduit to other components of a fluid system or machine are periodically subject to break. An example is a tubular fitting used for attaching a pipe that extends between an automotive engine intake manifold and a heater. That type of fitting has an end portion that is externally threaded for interfacing with an internally threaded opening in the manifold, thereby providing reliable attachment that may be rapidly connected and disconnected. Unfortunately, the fitting is prone to crack when subject to high torque or force, especially if the fitting has received many cyclic loadings. Typically when a fitting breaks, the externally threaded end portion separates from the remainder of the fitting and remains lodged within the opening of the manifold.

The broken portion of the fitting must be removed from the opening and a new fitting installed before the engine can be returned to normal operation. Unfortunately, the fitting and manifold are frequently positioned at a location having tight space constraints, making accessibility very difficult. To gain better access to the manifold, it can be necessary to disassemble parts of the engine or to remove the entire manifold. These steps take a substantial amount of time, and in view of the increased costs of automotive repair, are expensive. Further, there is no location on the broken fitting where a tool can readily engage the fitting to apply a torque that is strong enough to rotatingly remove it, especially so when the fitting is corroded within the manifold. A person can find it necessary to use a chisel or hacksaw to remove the broken fitting. These tools easily cause damage to the manifold.

Another alternative to remove the broken portion of the fitting is to grind it out using a conventional grinding tool with a powered drill. However, grinding increases the likelihood that the bore of the manifold will be damaged. Further, many tools of this type are too long, especially when the tool is combined with a drill, to permit alignment of the tool with the fitting for insertion unless the manifold is removed from the engine. If the grinding tool is not properly aligned, it may damage the structure of the manifold.

SUMMARY OF THE INVENTION

Among the several objects and features of the present invention may be noted the provision of a tool and process to remove a tubular member from a threaded bore; the provision of such a tool that operates in tight or confined space constraints; the provision of such a tool that permits removal of the tubular member without damaging the bore; the provision of such a method that removes a tubular member in a short period of time; the provision of such a tool that is economical; and the provision of such a tool that is easy to use.

A tool of the present invention removes a tubular member having a threaded exterior, such as a pipe fitting, from a threaded bore. The tool comprises a pilot section located at a front end of the tool for guiding the tool into an interior of the tubular member, the pilot having a cylindric shape along a longitudinal axis. A shank section is located at a back end of the tool and adapted for connection to a drill chuck, the shank section being aligned along the longitudinal axis. A central body engages the tubular member, the central body being located between the pilot section and the shank section, aligned along the longitudinal axis, and having a cross section transverse the longitudinal axis that is generally circular and that tapers in diameter from the shank section toward the pilot section along an entire length of the central body. At least one flute extends along a helical path on an exterior surface of the central body, the flute defining a cutting surface on the central body for cutting into the tubular member. The pilot section is adapted to guide the central body into the interior of the tubular member without the pilot section cutting into the tubular member, and the central body as disposed in the tubular member may grind away the tubular member without damaging the threaded bore.

In another aspect, a method of the present invention removes a tubular member having a threaded exterior, such as a pipe fitting, from a threaded bore. The method uses a tool having a longitudinal axis, a pilot section located at a front end of the tool, a shank section located at a back end of the tool, a central body located between the pilot section and the shank section and having a cross section transverse the longitudinal axis that is generally circular and that tapers from a narrowest diameter to a widest diameter along an entire length of the central body. The widest diameter is approximately equal to an inside diameter of the threaded bore. At least one flute extends along a helical path on the central body. The method comprises the steps of aligning the longitudinal axis of the tool with the tubular member and inserting the pilot section of the tool into an interior of the tubular member, thereby guiding the tool. An external surface of the central body is engaged against the interior of the tubular member. The tool is rotated at high speed whereby the flute grinds away the tubular member and does not grind away threads of the threaded bore for removing the tubular member without damaging the bore.

Other objects and features of the present invention will be in part apparent and in part pointed out hereinafter.

BRIEF DESCRIPTION OF THE DRAWINGS

Corresponding reference characters indicate corresponding parts throughout the views of the drawings.

DETAILED DESCRIPTION OF THE PREFERRED EMBODIMENT

Figure 1:
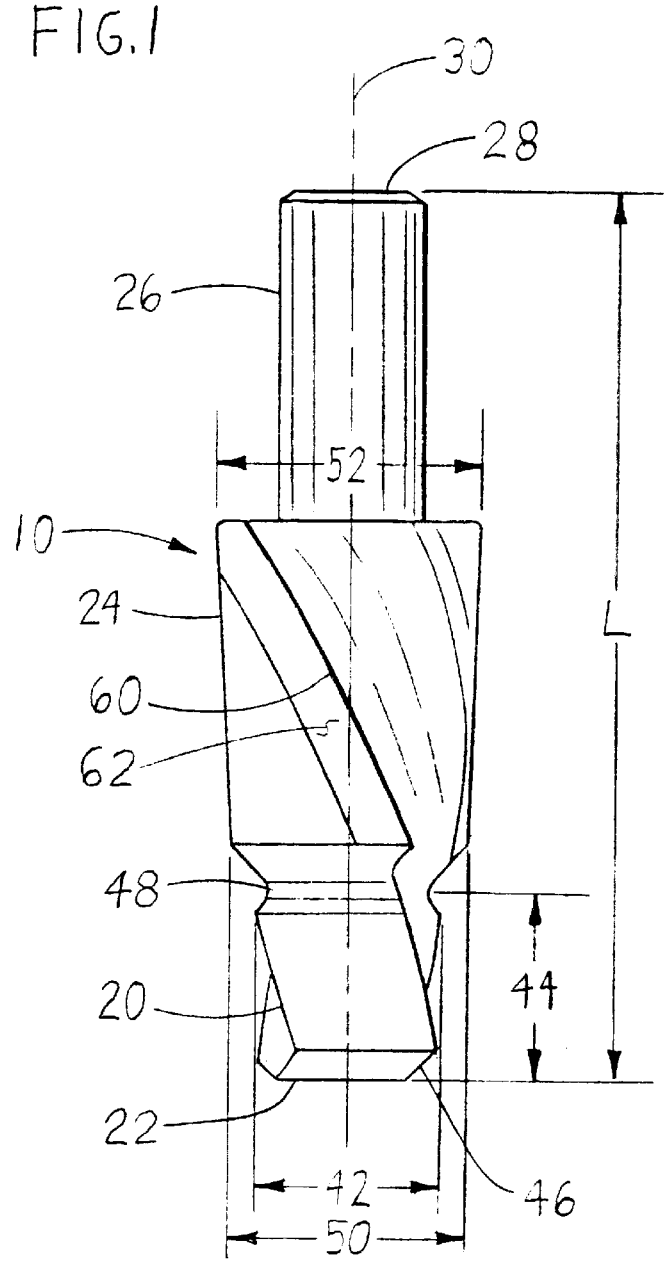
FIG. 1 is an elevational view of a tool of the present invention.
Figure 2:
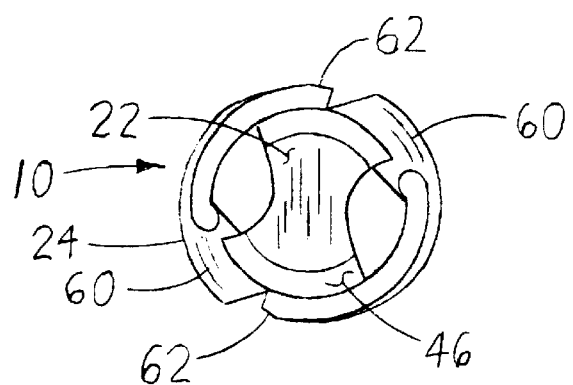
FIG. 2 is an end view of the tool.

Referring now to the drawings and in particular to FIGS. 1 and 2, a tool for removing a tubular member having a threaded exterior, such as a pipe fitting, from a threaded bore is indicated generally at 10. The tool 10 is particularly adapted for removing portions of a broken fitting that are lodged within an intake manifold of an automotive engine. The present description will primarily relate to that application. However, the tool 10 may be used in a variety of applications to remove material from an inner surface of tubular or hollow cavity without departing from the scope of the present invention.

The tool 10 is a rod or bar that is suitable for connection to a powered drill for rotatable grinding or drilling. The tool has three distinct sections, including a pilot section 20 located at a front end 22 of the tool, a central body 24 located in a central portion of the tool, and a shank section 26 located at a back end 28 of the tool. Each of the sections 20, 24, and 26 is symmetrically aligned along a longitudinal axis 30 and has a cross section transverse the longitudinal axis that is generally circular.

Figure 3:
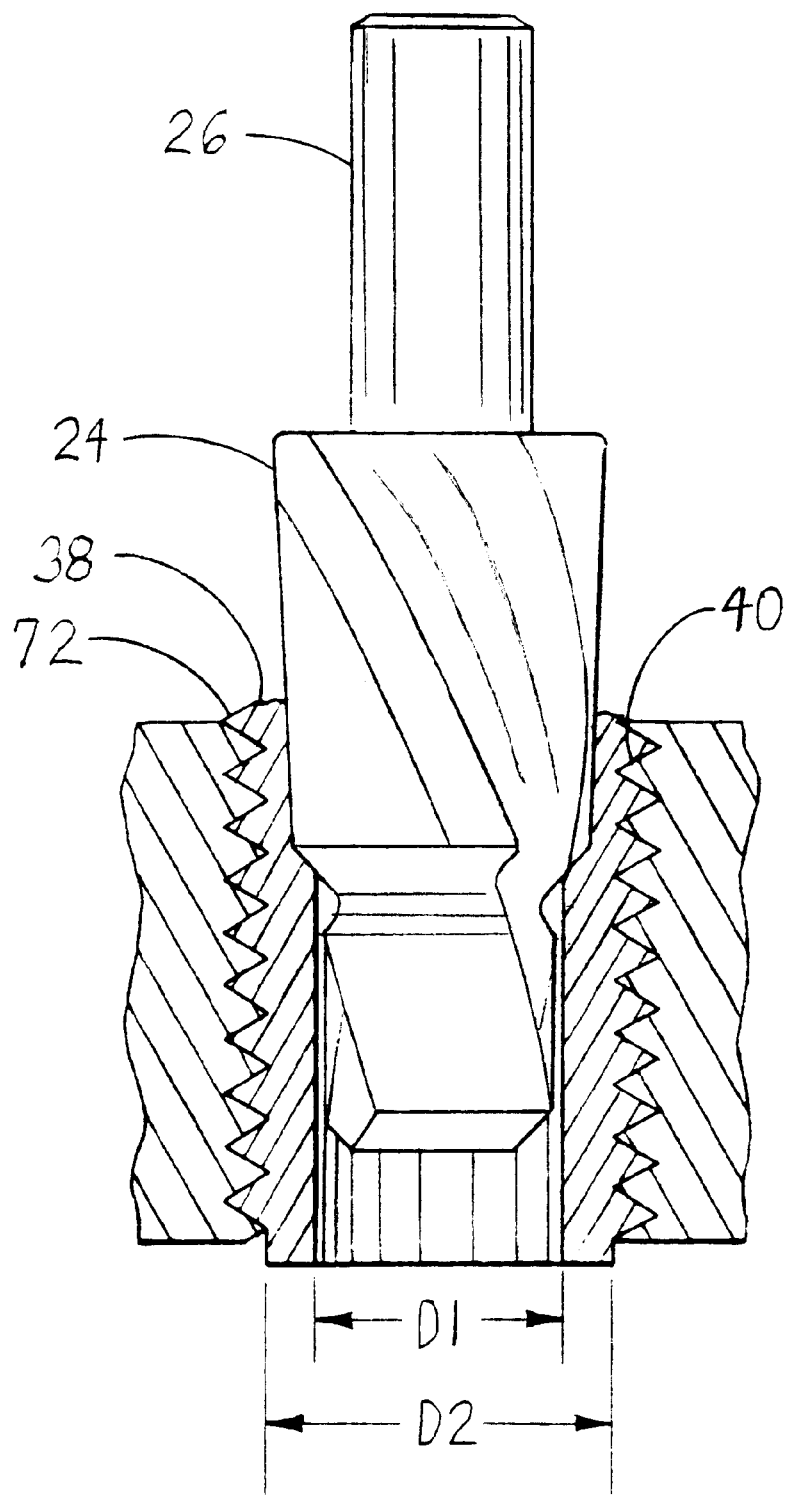
FIG. 3 is a fragmentary sectional view of a threaded bore showing the tool removing a broken portion of a pipe fitting.

Referring now to FIG. 3, the pilot section 20 is adapted for guiding the tool 10 into an interior of a tubular member 38 that is lodged within a threaded bore 40. The pilot section 20 has a generally cylindric shape and is sized to fit within the tubular member 38 when the pilot section and tubular member are aligned. A diameter 42 of the pilot section 20 is smaller than an inside diameter D1 of the tubular member 38 that is to be removed so that the pilot section may be inserted into an interior of the tubular member. However, the diameter 42 is large enough so that general alignment between the longitudinal axis 30 of the tool and the tubular member 38 is required to insert the tool. The diameter 42 is preferably between 50% and 99% of the inside diameter D1 of the tubular member 38, and more preferably about 70% of the inside diameter.

Like the diameter, a length 44 of the pilot section 20 is selected to be sufficient to require that the tool 10 be generally aligned with the tubular member 38 for insertion to a significant depth, but not excessively long so that the tool would be difficult to insert. Preferably, the length 44 is about 60% of the inside diameter D1. The pilot section 20 has a smoothly chamfered or beveled front edge 46, at an angle of about 45°, to facilitate easier insertion of the tool into the tubular member without causing damage. The chamfered edge 46 also avoids a sharp edge safety hazard for operators who handle the tool 10. Tools with pilot sections of other sizes, without chamfered edges, or with other angles of chamfer do not depart from the scope of this invention. An annular groove 48 is positioned between the pilot section 20 and the central body 24.

The central body 24 is adapted for engaging the tubular member 38. The central body 24 has a shape of a frustum of a right circular cone, with generally circular cross sections transverse to the longitudinal axis 30 that taper in diameter along an entire length of the central body. The central body 24 extends from a narrowest diameter 50 located at a front end of the central body to a widest diameter 52 located at a back end of the central body. The taper in cross sectional diameter along the central body 24 between the narrowest diameter 50 and the widest diameter 52 is preferably constant so that a slope is linear.

The size of the central body 24 is selected generally to correspond to sizes of the tubular member 38 and the threaded bore 40. The widest diameter 52 is at least as large as the inside diameter D1 of the tubular member (FIG. 3). Preferably, the widest diameter 52 is less than or equal to an inside diameter D2 of the threaded bore 40 so that the tool grinds the tubular member 38 but does not significantly contact or damage the threaded bore. An angle of taper and narrowest diameter 50 are selected so that the central body 24 is adapted to engage a corresponding range of sizes in tubular members.

If the widest diameter 52 of the central body is greater than the inside diameter D2 of the threaded bore, damage is avoided by inserting the tool 10 into the tubular member 38 to only a partial extent. In this case, the tubular member 38 is engaged by the central body 24 at an intermediate location along the sloped surface, less than the widest diameter. The tool 10 never contacts the threaded bore while accomplishing the desired removal of the tubular member. If damage should inadvertently occur to the threads of the bore 40, the threads can be restored by subsequent use of a tap.

Two flutes 60 extend along respective helical path segments on an exterior surface of the central body 24 for grinding. Each flute 60 has a sharp edge defining a cutting surface to facilitate abrasive grinding. Sharpness of the edge of each flute 60 is increased by a back-cut region 62. The back-cut 62 is formed in the exterior surface of the central body 24 extending in a helical path adjacent the flute 60, tapering the edge of each flute 60 to slightly increase its sharpness. The flute 60 extends along the entire length of the central body 24 and extends continuously along an entire length of the pilot section 20. However the portion of the flute on the pilot section is included solely for economical manufacture of the tool. The pilot section 20 does not engage the tubular member 38 nor accomplish any grinding. Accordingly, the back-cut 62 does not extend onto the pilot section 20. It is understood that a tool with a pilot section having a smooth external surface (no flute) or having a back-cut does not depart from the scope of this invention. The flutes 60 may have any suitable pitch and are cut in a left-hand direction so that counter-clockwise rotation of the tool 10 accomplishes effective grinding. Typically, the threads of the tubular member 38 and bore 40 are arranged so that counter-clockwise rotation removes the tubular member from the bore. Therefore, the counter-clockwise rotation of the tool 10 during grinding permits the tool to simultaneously apply a torque to the tubular member 38 which urges rotation relative to the bore 40. If the tubular member 38 does begin rotating, that may permit removal of the tubular member from the bore 40 without further grinding. It is to be understood that a tool having a flute cut in a right-hand direction, a single flute, or more than two flutes does not depart from the scope of this invention.

The shank section 26 is configured for connection to a source of rotational motive force, such as a conventional electric drill (not shown). Preferably, the shank section 26 is cylindrical in shape and sized for engagement by a key-type chuck of the drill. The back end 28 of the shank 26 is chamfered or beveled to improve safety. Tools having a shank of different shape or having a different provision for connection to a drill do not depart from the scope of this invention.

The tool 10 is preferably formed of one piece of material that is solid, i.e., having no hollow cavities or fasteners, for good strength and economical manufacture. The tool is made of a material that is suitable for grinding through conventional pipe fittings, such as a steel. However, tools formed with two or more pieces that are attached together, having internal cavities, or formed of different materials do not depart from the scope of this invention.

The tool has a total length L that is fairly small so that the tool may be aligned and inserted into a threaded member that is located in an area of tight space constraints, such as a vehicle's engine cavity. Preferably, the total length L is less than about three inches, and more preferably about 2.3 inches, and a length of the central body 24 is about 1 inch. This size is preferred for use in a standard automobile engine. Tools of other sizes do not depart from the scope of this invention.

In operation, the tool 10 is used to remove the tubular member 38 from the threaded bore 40. A size of tool is selected relative to the size of the threaded bore. Preferably, the widest diameter 52 of the central body 24 is less than or equal to an inside diameter D2 of the bore 40. The tool 10 is attached to a power drill or system for high-speed rotation.

The drill may be of a type that facilitates operation in tight space constraints, such as a conventional right-angle drill. A flexible extender (not shown) may be used with the drill to facilitate access to hard-to-reach locations. A conventional key-type chuck (not shown) may be used to tightly grip the shank section 26 of the tool. The tool 10 is positioned so that its longitudinal axis 30 generally aligns with the tubular member 38. If the tubular member is located where space is tight, it may be difficult to maneuver the tool and drill so that the tool is at an aligned position with the tubular member, and the advantage of the relatively small length L of the tool is apparent.

The pilot section 20 of the tool is inserted into an interior of the tubular member 38 in a lengthwise direction, thereby guiding the tool into an axially aligned position within the interior. The central body 24 of the tool engages the interior of the tubular member 38. Depending on the relative sizes, the central body 24 may engage the tubular member 38 anywhere along the central body between the narrowest diameter 50 and the widest diameter 52. The tool 10 is rotated at high speed, preferably by operation of the power drill, whereby the flute 60 grinds away the tubular member 38. Because it is aligned, the tool grinds evenly from the complete circumference of the tubular member 38. As grinding progresses, the tool 10 may be gradually inserted further into the tubular member 38, as with conventional drilling. As it grinds, the tool applies a torque to the tubular member 38. Due to the counter-clockwise direction of rotation, the torque urges rotation of the tubular member 38 relative to the bore 40. If the tubular member 38 does begin rotating, it may permit removal of the tubular member in one piece from the bore without further grinding. If not, grinding continues until all of the tubular member 38 is removed. The tool can be inserted entirely through the threaded bore, or an operator may limit insertion to a point where the widest diameter 52 of the central body is flush with an entrance 72 of the opening of the bore.

Significantly, the tool 10 may remove the tubular member 38 without damaging the threaded bore 40 of an intake manifold. If the widest diameter 52 of the central body 24 is less than or equal to the inside diameter D2 of the threaded bore 40, the tool will pass through the bore without contacting the threads of the bore. In practice, the tool 10 occasionally does not need to be inserted that far into the bore 40 because initial grinding by intermediate areas on the surface of the central body 24 causes the entire tubular member to start rotation, permitting its rapid removal without further grinding. If damage to the threads of the bore 40 does inadvertently occur, a tap may be used to restore the threads after the tubular member and tool are removed.

Thus, the tool permits removal of an externally threaded fitting from an internally threaded intake manifold without disassembly of the engine or components thereof. Although the description has been with regard to removing fittings from bores with straight or constant width threads, the tool may be also be used with bores or pipe threads that are tapered in width over a longitudinal extent.

In view of the above, it will be seen that the several objects of the invention are achieved and other advantageous results obtained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A tool for removing a tubular member having a threaded exterior, such as a pipe fitting, from a threaded bore, the tool comprising:

a pilot section located at a front end of the tool for guiding the tool into an interior of the tubular member, the pilot having a cylindric shape along a longitudinal axis;

a shank section located at a back end of the tool and adapted for connection to a drill chuck, the shank section being aligned along said longitudinal axis;

a central body for engaging the tubular member, the central body being located between the pilot section and the shank section, aligned along said longitudinal axis, and having a cross section transverse the longitudinal axis that is generally circular and that tapers in diameter from the shank section toward the pilot section along an entire length of the central body;

at least one flute extending along a helical path on an exterior surface of the central body, the flute defining a cutting surface on the central body for cutting into the tubular member, and wherein the flute continuously extends the entire length of the central body and an entire length of the pilot section; and a back-cut on the tool for sharpening the cutting surface, the back-cut extending adjacent said flute on the exterior surface of the central body;

whereby the pilot section is adapted to guide the central body into the interior of the tubular member without the pilot section cutting into the tubular member, and the central body as disposed in the tubular member may grind away the tubular member without damaging the threaded bore.

2. A tool for removing a tubular member having a threaded exterior, such as a pipe fitting, from a threaded bore, the tool comprising:

a pilot section located at a front end of the tool for guiding the tool into an interior of the tubular member, the pilot having a cylindric shape along a longitudinal axis;

a chamfered edge on the front end of the pilot section;

a shank section located at a back end of the tool and adapted for connection to a drill chuck, the shank section being aligned along said longitudinal axis;

a central body for engaging the tubular member, the central body being located between the pilot section and the shank section, aligned along said longitudinal axis, and having a cross section transverse the longitudinal axis that is generally circular and that tapers in diameter from the shank section toward the pilot section along an entire length of the central body; and at least one flute extending along a helical path on an exterior surface of the central body, the flute defining a cutting surface on the central body for cutting into the tubular member, and wherein the flute continuously extends the entire length of the central body and an entire length of the pilot section;

whereby the pilot section is adapted to guide the central body into the interior of the tubular member without the pilot section cutting into the tubular member, and the central body as disposed in the tubular member may grind away the tubular member without damaging the threaded bore.

3. The tool as set forth in claim 2 wherein said at least one flute is cut in a left-hand direction so that counter-clockwise rotation of the tool accomplishes removal of said tubular member.

4. The tool as set forth in claim 2 further comprising an annular groove located between the pilot section and the central body.

5. The tool as set forth in claim 1 wherein said back-cut is limited to said central body and does not extend onto the pilot section.

6. The tool as set forth in claim 1 wherein said at least one flute is cut in a left-hand direction so that counter-clockwise rotation of the tool accomplishes removal of said tubular member.

7. The tool as set forth in claim 1 wherein there are two flutes.

8. The tool as set forth in claim 1 further comprising an annular groove located between the pilot section and the central body.

9. The tool as set forth in claim 8 wherein the central body has a narrower end oriented toward the pilot section and a wider end oriented toward the shank section, the wider end having a diameter that approximates a diameter of the threaded bore.

10. The tool as set forth in claim 1 further comprising a chamfered edge on the front end of the pilot section.

11. The tool as set forth in claim 1 wherein the tool is formed as one piece.

12. The tool as set forth in claim 11 wherein the tool is formed of steel.

13. The tool as set forth in claim 1 wherein a length of said tool is no greater than about 2.3 inches.

14. The tool as set forth in claim 13 wherein the length of said central body is no greater than about 1 inch.

15. A method of removing a tubular member having a threaded exterior, such as a pipe fitting, from a threaded bore, the method using a tool having a longitudinal axis, a pilot section located at a front end of the tool, a shank section located at a back end of the tool, a central body located between the pilot section and the shank section and having a cross section transverse the longitudinal axis that is generally circular and that tapers from a narrowest diameter to a widest diameter along an entire length of the central body, the widest diameter being approximately equal to an inside diameter of the threaded bore, and at least one flute extending along a helical path on the central body, the method comprising the steps of:

aligning the longitudinal axis of the tool with the tubular member;

inserting the pilot section of the tool into an interior of the tubular member, thereby guiding an insertion of the tool;

engaging an external surface of the central body against the interior of the tubular member;

rotating the tool at high speed whereby said at least one flute grinds away the tubular member and does not grind away threads of the threaded bore for removing the tubular member without damaging the bore.

16. A method as set forth in claim 15 further comprising limiting insertion of the tool to a position where said widest diameter of the central body is flush with an entrance of the bore.

17. The tool as set forth in claim 2 wherein the central body has a narrower end oriented toward the pilot section and a wider end oriented toward the shank section, the wider end having a diameter that approximates a diameter of the threaded bore.

* * * * *